May 3, 1966 H. SCHOTTLER 3,248,960
VARIABLE SPEED DRIVE TRANSMISSION
Original Filed Sept. 23, 1955 5 Sheets-Sheet 1

Fig 1.

INVENTOR.
HENRY SCHOTTLER
BY

May 3, 1966  H. SCHOTTLER  3,248,960
VARIABLE SPEED DRIVE TRANSMISSION
Original Filed Sept. 23, 1955  5 Sheets-Sheet 2

INVENTOR.
HENRY SCHOTTLER

United States Patent Office 3,248,960
Patented May 3, 1966

3,248,960
VARIABLE SPEED DRIVE TRANSMISSION
Henry Schottler, North Riverside, Ill., assignor, by mesne assignments, to Roller Gear Ltd., Zug, Switzerland, a corporation of Switzerland
Continuation of application Ser. No. 536,231, Sept. 23, 1955. This application Nov. 13, 1959, Ser. No. 852,902
28 Claims. (Cl. 74—200)

This application is a continuation of my prior co-pending application Serial No. 536,231, filed September 23, 1955, now abandoned, entitled "Variable Speed Drive Transmission."

The invention relates to mechanical variable speed transmissions in which balls rolling between inner and outer races are used as power transmitting means.

The essential requirements for an economical transmission of this type for a wide speed range may be defined as follows:

(1) Balance of the heavy contact forces within the transmission so as to prevent thrusts on the shaft bearings.

(2) Minimum pressures at the points of contact of the power transmitting members for the entire speed range to prevent slippage and reduce the losses due to friction or rolling resistance.

(3) Different contact paths of the power transmitting members at different speed ratios to increase the useful life of said members.

(4) Simple mechanism for changing the speed ratio.

(5) Torque responsive means which provide the necessary pressures at the points of contact to prevent slippage for any power to be transmitted in both directions through zero, including shock load.

(6) Extended speed range reacting preferably from zero to a multiple of the input speed in both directions.

(7) Simple design for low cost production.

It appears that none of the known speed transmissions combines all the desirable features recited above.

Some transmissions have balanced forces and attain a high efficiency at a certain speed ratio, but at other speed ratios their efficiency curve is declining. Other devices provide a more constant efficiency curve but only for very limited speed ranges. Even the most recent developments, described, for instance, in the paper by Charles E. Kraus, New Approaches to Variable Speed Drives, published in Machine Design, December 1953, succeed only in balancing the contact forces but do not solve at the same time the other problems. In said transmissions, the pressures at the points of contact vary with the location of the contact points and are determined by spring pressure; too low spring pressures will cause stoppage at certain torques, and too high spring pressures will produce at lower torque rates higher pressures than necessary. These and other shortcomings of the known transmissions limit the speed range from a 4:1 reduction to about a 2 to 1 speed up.

It is an object of the invention to provide an improved variable speed transmission of the character described which can be economically manufactured, satisfies all the requirements set forth above and is operative at a speed range from $\infty$:1 (output speed zero) to about 2½ to 1 speed up.

Other objects and advantages will be apparent from a consideration of the specification and claims.

The invention will be more fully explained with reference to the accompanying drawings in which several embodiments are illustrated, by way of example, and in which.

Figure 1:
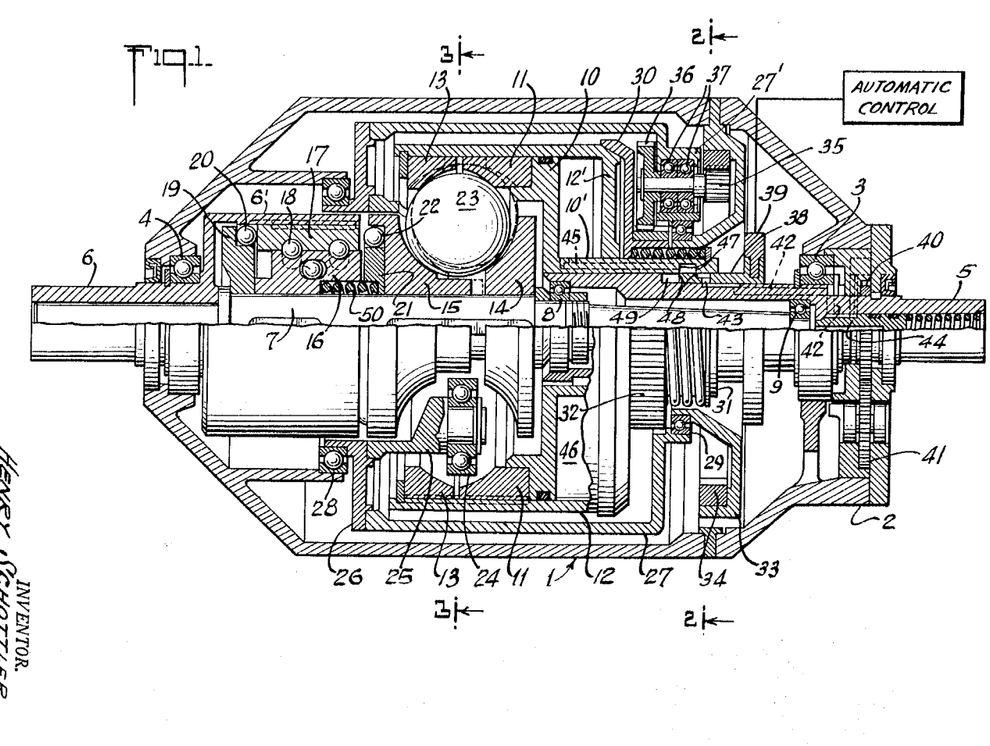
FIG. 1 shows a first gear according to my invention, partly in longitudinal section, and partly in side elevation.
Figure 2:
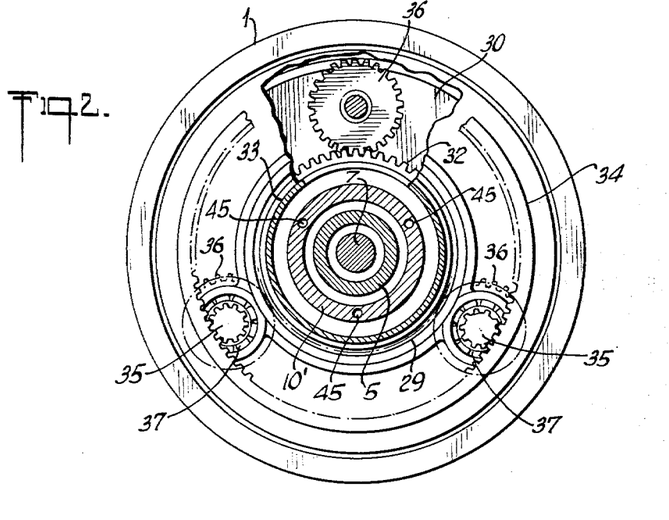
FIG. 2 is a vertical sectional view taken on line 2—2 of FIG. 1.
Figure 3:
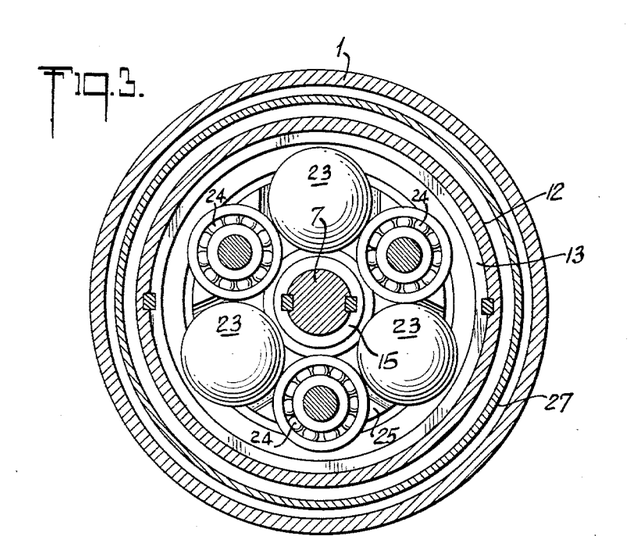
FIG. 3 is a vertical sectional view taken on line 3—3 of FIG. 1.

In the embodiment of the invention illustrated in FIGS. 1 to 3, the driving shaft is designated by the reference numeral 5 and the coaxial driven shaft by the numeral 6. Shaft 6 is supported in the gear housing 1 by a ball bearing 4. An intermediate shaft 7 is freely rotatable in the hollow shaft 6 and at its other end freely supported in ball bearings 8 and 9 arranged inside the shaft 5.

The inner races 14 and 15 are mounted on said intermediate shaft 7; the one inner race, 14, is fixedly secured thereto, the other inner race 15 is mounted non-rotatably but for free movement in axial direction. One outer race 11 is mounted on shaft 5 non-rotatably but slidably in axial direction and connected in the same way at its outer circumference with an oil cylinder 12, which forms part of a hydraulic control to be described hereinbelow. The other outer race 13 is fixedly secured to said oil cylinder 12.

A suitable number of uniformly spaced steel transmission balls 23 are located in the annular groove formed by the inner and outer races.

In the shown construction, three of such balls are provided between rollers 24 which are freely rotatable around axes parallel to the axis of the transmission and the spinning axis of the balls 23. Said axes are carried by a spider or carrier 25 and form preferably the stationary inner race of a roller bearing, the outer rotatable race of which forms the roller surface supporting the balls 23.

The carrier 25 is by means of a disc 26 rigidly connected to a bushing 27, which is rotatable on ball bearings 28 and 29. Said ball bearing 29 is supported by a member 33, which is centered between the gear housing 1 and the cover 2. The hub 27' of the bushing 27 carries also three sets of planetary gears 35, 36 which are supported in ball bearings 37. The smaller planetary gears 35 mesh with an internal gear 34 secured to the housing 1, the larger gears 36 with an external gear 32. Said gear 32 is carried by a clutch disc 30, which is frictionally connected by a helical spring 31 with the cylinder 12.

A spring 50 forces the inner races 14, 15 against the balls 23 and said balls against the outer races 11, 13 with sufficient power to keep all transmission members at all times in frictional engagement.

As will be noted on viewing the drawing, the raceways of the outer races have a curvature formed by a radius which is considerably greater than the radius of the curvature of the inner raceways. This is an important feature of my novel transmission and ensures an easy adjustment of the power transmitting members over a wide speed range. I have found that for a smooth and efficient operation of my transmission, the radii of the generating curves of the raceways and the radius of the balls should satisfy the relation $$r_o - r \geqq 2(r_1 - r)$$

wherein $r$ is the radius of the balls, $r_o$ the radius of the generatrix of the curvature of the outer raceways, and $r_1$ the radius of the generatrix of the curvature of the inner raceways. From a manufacturing point of view, it may be an advantage to make $r_o$ of the equation infinite, which means that the contacting surface of the outer race assumes the form of an internal cone.

Torque responsive loading means have to be arranged between the inner races and the driven shaft. Various constructions of such torque loading means are known but I have developed an improved design of such torque loading means or pressure changer, which design is particularly suitable in connection with my novel transmission and represented in the drawing by the reference numerals 16 to 22.

The torque responsive means shown in FIG. 1 is a friction screw device comprising an inner member 16 secured to the intermediate shaft 7 and an outer screw member 17 secured to a tubular extension 6' of the output shaft 6; both members are threaded to form a helical groove for a plurality of steel balls 18 freely rolling therein. A disc 21 is pressed against the inner race 15 by spring 50 and retains a plurality of balls 22 freely rolling between the plane faces of said inner race 15 and outer screw member 17. At the outer end of the screw device, a disc 19 is secured to shaft 7 and forms an annular groove for balls 20 freely rolling in frictional contact with said disc 19 and said outer screw member 17.

The transmission may be adjusted by hand, but in larger units the adjustment is preferably made hydraulically, and a suitable hydraulic control of the outer races is by way of example, shown in FIGS. 1–3.

Figure 4:
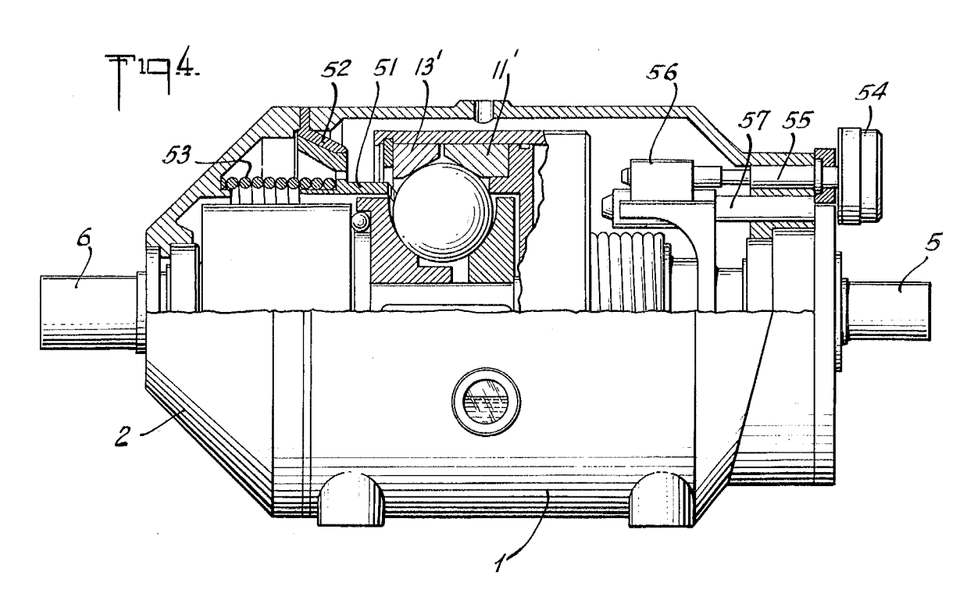
FIG. 4 is a view similar to FIG. 1 of another embodiment of simple construction according to the invention.

The hydraulic control comprises the already mentioned oil cylinder 12 fixedly connected with the outer race 13 and a disc 10 integral with a hollow shaft 10'. Disc 10 is axially slidable like a piston in cylinder 12. The part 12' of cylinder 12 forms the closure of oil cylinder 46 and is slidable with a tight fit on said hollow shaft 10'. A freely rotatable bushing 38 is slidable in axial direction between shafts 5 and 10' and forms part of a slide valve operated by the member 39, which is rotatable on bushing 38 and connected with control means like 54, 55 as shown in FIG. 4. The oil for the cylinder 46 is supplied through the channels 42, 43 of the slide valve and openings 45, by a gear pump 40, 41 arranged on shaft 5. A spring loaded overflow valve 44 is provided inside a bore of shaft 5.

The above mentioned spring 31, which acts against the cylinder 12, forces thereby the outer races 11 and 13 apart against the oil pressure in cylinder 46.

The operation of the novel drive is as follows:

Power is applied with constant input speed to the input shaft 5. The outer races 11, 13 rotate with input speed. The planetary gears 35, 36 engaged with gears 32 and 34 rotate the carrier 25 with reduced speed in the same direction.

The balls 23 are spinning around their own axis parallel to the main axis of the drive and according to the rotation of the carrier 25, in planetary fashion around the drive axis.

Due to the pressure caused by the pressure device 16, 17, 18 in proportion to the output torque, and an additional pressure by spring 50, the balls 23 frictionally engage the outer races 11, 13 and the inner races 14, 15 and force the inner races to rotate in opposite direction.

Depending on the acting diameters of the rolling members and the speed of carrier 25, a certain output speed is obtained. Said speed can be varied by moving the outer races 11, 13 apart or together.

In the position shown in FIG. 1, the output speed will be about 1.6 times the input speed. By moving the outer races 11, 13 apart into the position indicated by dotted lines, the output speed will be about 0.07 times the input speed, but in opposite direction.

This means that a torque converter with a speed range as mentioned above when used as a car transmission would provide (a) a forward drive up to 60% overdrive or 80 m.p.h. (considering 50 m.p.h. for a speed ratio 1:1)
(b) a reverse drive up to 7% or 3.5 m.p.h., and
(c) a start to either direction from zero without clutch.

This ideal speed range is attained at a constant most economical motor speed without disengaging the drive mechanism. Thus, full automatic control governed by motor speed and torque or in connection with the gas pedal is readily obtained.

The action of the pressure chamber is as follows:

A torque applied at the output shaft will rotate the female part 17 and cause an axial displacement of part 17 to part 16 in one or the other direction, depending on the direction of torque or the kind of thread—RH or LH. The thus produced axial forces will be always in proportion to the output torque and will force both inner races 14, 15 against the balls 23. The balls 20 and 22 are necessary to prevent any locking action between part 17 and parts 19 or 15.

The new transmission is working like a positive gear without slippage, even if shock load is applied. With output speeds around zero excessive torque might damage the unit. Instead of a special safety clutch, the simple springloaded disc 30 is arranged to slip when the permissible output is exceeded, thus protecting internal parts of the unit.

The hydraulically operated speed change of the transmission is controlled by the bushing 38. If said bushing is moved to the left, oil will be pressed through openings 45 into the oil cylinder 46. The outer races 11, 13 are pressed together, forcing the inner races 14, 15 by balls 23 apart until the control edges 47 of the moving part 10' and the control edges 48 of the set bushing 38 coincide again.

By moving the bushing 38 to the right, oil is pressed out of the oil cylinder 46 by the pressure device 16, 17, 18, the spring 50 and the spring 31 through openings 45 and chamber 49 into the oil reservoir until the control edges 47 of the moving part 10' and the control edges 48 of the set bushing 38 are coinciding again.

Thus, every position of the control bushing 38 means a certain speed ratio. Since this bushing 38 is without any load, the speed of this new drive can be controlled with a small dial knob. The previously mentioned full automatic control can be achieved at least partially through suitable automatic control of the position of the bushing 38, as schematically illustrated in FIGURE 1.

A somewhat simpler construction of the transmission which is basically similar to the embodiment of the invention shown in FIGS. 1–3, is represented in FIG. 4.

In the embodiment shown in FIGS. 1–3, the ball retainer 24, 25 is rotatably mounted, which is of advantage for variable speed drives subjected to considerable loads at zero point. Under these conditions, contact between the balls and the races at points located in the spinning axis A—A (FIG. 9) of the balls should be avoided because it would not produce transmission of power and because it is for constructional reasons difficult to supply said points with oil and to protect them against excessive wear.

However, where the requirements for a transmission are less severe, the simplified construction of FIG. 4, which covers a speed range from zero to about 2.5 times the input speed, is fully satisfactory. In this modification of the transmission, the ball carrier is not rotating but may be rigidly or frictionally attached to the housing, so that the parts 27–37 of the construction of FIGS. 1–3 can be omitted. As shown in FIG. 4, a ball carrier 51 is pressed against a disc 52 by a spring 53. When the permissible output torque is exceeded, the carrier 51 will slip on disc 52, preventing overload of the internal parts of the drive.

The control bushing 38 (FIG. 1; not shown in FIG. 4) is connected with a guide member 56 slidably arranged on rod 57; said guide part is adjustable by a dial knob 54 over a spindle 55.

The outer races 11' and 13' are straight internal cones.

Another embodiment of the invention is illustrated in FIGS. 5 to 11.

Figure 5:
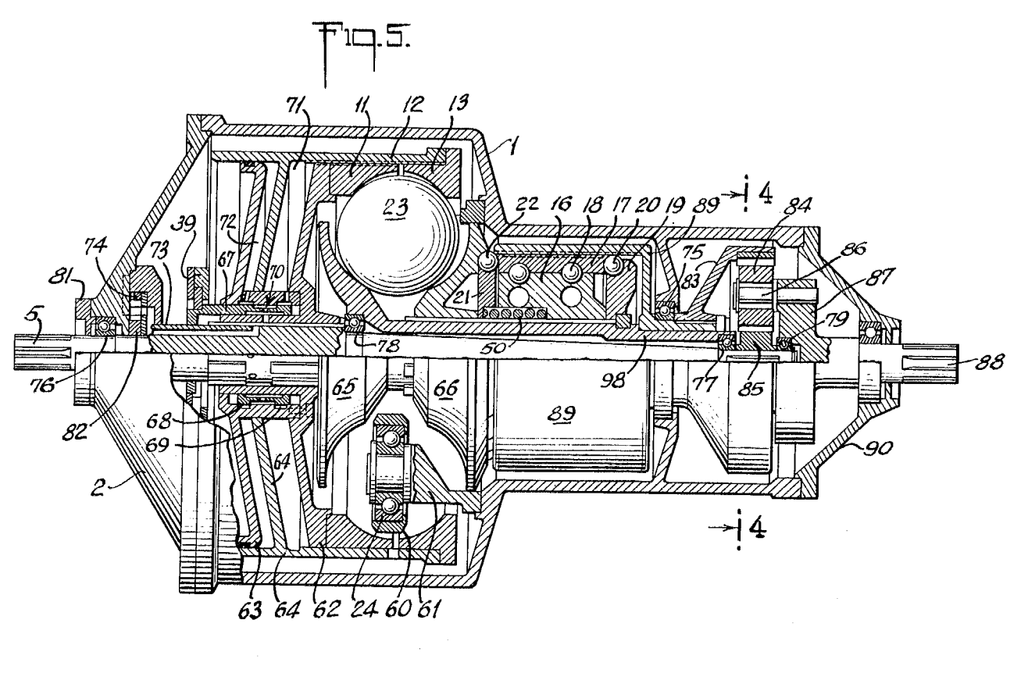
FIG. 5 shows still another embodiment of the invention partly in longitudinal section, and partly in side elevation.

This transmission will cover a speed range from about reverse 0.21 times the input speed through zero to about 1.5 times the input speed forward. Different speed ranges can be obtained by changing the proportions of the planetary gears. Such transmission without additional planetary gears would cover a speed range from zero to about 2.35 times the input speed.

The gear type according to FIG. 5 is basically the same as shown in FIGS. 1 to 4. Therefore, similar parts have been designated by the same reference numerals.

A hydraulic control for speed change is provided which allows positive control in both directions by forcing the outer races together for a speed increase and by forcing them apart for a speed decrease.

The outer race 13 is firmly secured to the cylinder 12, while the outer race 11 is non-rotatable but axially displaceable inside cylinder 12 in close contact thereto. Inside cylinder 12 a disc 62 is mounted non-rotatably but slidably in axial direction on shaft 5 and firmly connected at its outer circumference with the outer race 11. Another disc 63 has a hub rigidly secured to said disc 62 and slides with its outer periphery in close fit (with sealing ring) along an extended open end of the cylinder 12. A conicaly shaped disc 64 integral with cylinder 12 slides with close fit on said hub of disc 63 and divides said cylinder 12 into two oil chambers 71 and 72.

A slide valve 67 is located inside an opening formed in the hubs of the discs 62 and 63. Said slide valve 67 controls the oil supply from a ring space 70 to the oil chambers 71 and 72 by means of pairs of control edges 47 and 48.

The slide valve body may be a bushing arranged inside the hubs of the discs 62 and 63 (FIG. 10) or it may also be located outside the rotating parts of the transmission or even outside the unit proper. An example for the last mentioned arrangement is shown in FIG. 11, where an axially movable rod 67' is located inside a bushing 99 connected with one of the discs 62 or 63 (FIG. 11) preferably in such a manner that the axial displacement of said bushing 99 is a multiple of the corresponding displacement of said discs, which results in a more sensitive speed control.

Figure 6:
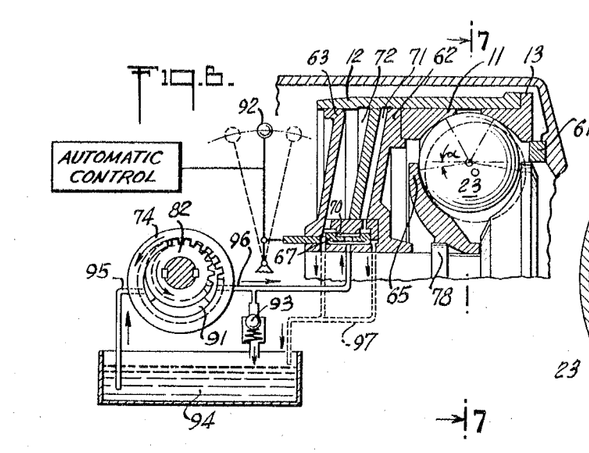
FIG. 6 shows a part of the transmission of FIG. 5 with balls and races in a different position (low output speed) including a diagrammatic sketch of a hydraulic control system.

As noted above, the inner races 14 of FIG. 1 and 65 of FIG. 5 are fixed in axial position. The advantage of such a construction will become apparent on consideration of FIG. 9. On changing speed, the inner race 66 (or 15, respectively) performs the entire necessary axial movement. Since the center line of the balls and both inner and outer races, indicated with line 7—7 in FIG. 6, is moving axially one half of this amount, indicated by D in FIG. 9, the balls which are pressed against the axially fixed rollers 60, due to the torque applied, will be forced to tilt around an axis going through their center point C, which axis coincides with line 7—7 and is perpendicular to the main spinning axis A—A.

Figure 9:
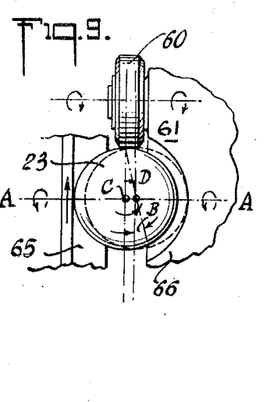
FIG. 9 is an illustration of one ball and one roller of the retainer viewed in direction E of FIG. 7.

At each speed change, the balls 23 will therefore roll upon different tracks, and the entire ball surface will be utilized more economically with respect to transmission wear.

The operation of the drive illustrated in FIGS. 5 to 11 is as follows:

Power is applied with constant input speed to the input shaft 5. The outer races 11, 13 rotate with input speed. The oil pump 82 which is keyed to shaft 5 is pressing oil into a ring space 70, keeping the outer races in an axially fixed position. This position is predetermined by a certain position of the valve 67 according to the desired speed ratio.

The balls 23 are pressed against, and rotated, by the outer races 11, 13, revolving around their fixed axis, parallel to the main axis of the drive.

The rotating balls 23 are forcing the inner races 65, 66, which are pressed against the balls 23, to rotate in opposite direction to the outer races. The hollow shaft 98 and the inner member 16 of the pressure device are rotating with the same sped as the inner races 65, 66. The bushing like part 89 of the output shaft and the internal gear 83 of the planetary gear, which are transmitting the output torque, are forced by balls 18 of the pressure device to rotate also with the speed of the inner races 65, 66.

Since the balls 18 are located in helical threads of the inner member 16 and the outer member 17 of the pressure device, the applied output torque will create a necessary axial pressure according to the lead of the helical threads, forcing the inner races 65, 66 against the balls 23, preventing slippage between balls and races under all load conditions.

For changing speed, manually (92) or automatically, the valve 67 has to be brought into the desired position, representing the desired output speed. Automatic speed changing is achieved through utilization of a suitable automatic control, as schematically illustrated in FIGURE 6, for moving the valve 67 into the desired position in the same manner as manipulation of the lever 92 accomplishes manual speed changing.

Since the four control edges 47, 48 of the valve bushing 67 and the hub of part 63 have to register for balanced position, any axial move of the valve bushing 67 will be automatically followed by the same axial move of 63 and the attached disc 62 with outer race 11.

Figure 10:
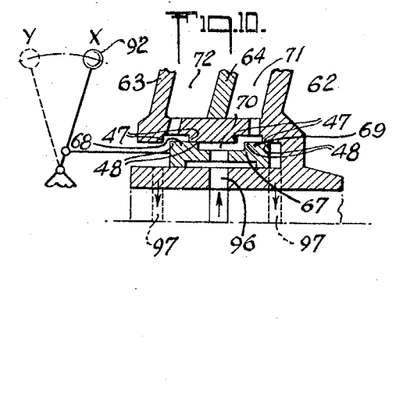
FIG. 10 is a section of the control valve in a position for increasing output speed.
Figure 11:
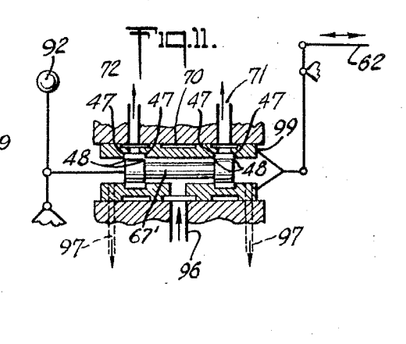
FIG. 11 shows diagrammatically a hydraulic control system located outside the unit.

For example as shown in FIG. 10, the valve 67 may be moved to the right by shifting the lever 92 into the position X. Immediately, oil from the oil pump 82 and line 96 is flowing through the free ring opening under pressure into the chamber 71, moving discs 62 and 64 axially apart and at the same time discs 63 and 64 together, pressing oil out of the chamber 72 through the free ring opening into the line 97 and back to an oil reservoir 94 (FIG. 6).

This axial movement of parts 62, 63 and 64 and the outer races 11 and 13 takes place until the control edges 47 and 48 are registering again and shut off the oil supply. By this action, the outer races 11 and 13 have pressed the balls 23 more to the center of the unit, squeezing the inner races 65, 66 axially apart, causing change of contact points between the power transmitting balls and races and thus speed increase. After closing off the ring rooms 68, 69, and 70, oil from the oil pump in line 96 will be pressed through an overflow valve 93 back into the oil reservoir 94, forming a cycle from the reservoir 94, line 95, oil pump 82, line 96, overflow valve 93, oil reservoir 94.

To reduce the output speed, the valve 67 has to be moved into the opposite position by shifting lever 92 into the position Y. Oil under pressure will flow through a free ring opening into the chamber 72, forcing discs 63 and 64 apart and at the same time forcing the discs 62 and 64 together; on the other hand, oil will be drained from chamber 71 through a free ring opening through line 97 back into the oil reservoir 94.

The axial movements of the parts 62, 63 and 64 will stop as soon as the control edges 47 and 48 register again. During this action, the outer races 11 and 13 are forced apart, while the balls 23 are pressed against the outer races by components of the axial forces, actuated by the pressure device, which is forcing the inner races 65 and 66 together, always in proportion to the output torque.

Figure 7:
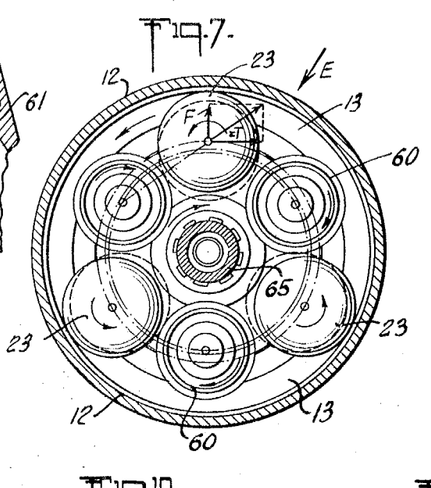
FIG. 7 is a vertical sectional view of the balls, races and ball carrier taken on line 7—7 of FIG. 6.
Figure 8:
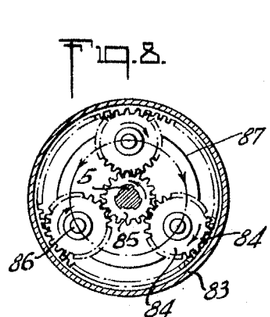
FIG. 8 is a vertical sectional view of the planetary gears taken on line 4—4 of FIG. 5.

At low output speeds, when due to a small contact angle the forces transmitted by the pressure changer might be insufficient for a safe contact against the apart moving outer races, additional forces F, resulting from the reaction forces against the rollers 60, due to the transmitted torque T at each ball 23 will press the balls 23 outward (see FIG. 7).

Variable speed drives according to the present invention, of which the inner races are driven with constant speed will allow a speed range of the outer races from approximately 0.4 to about 5 times the input speed, depending on the kind of application.

The same unit with outer races driven with constant speed would allow a speed range of the inner races from zero to about 3 times the input speed, if the ball retainer is not rotating.

Since a speed reduction down to zero or even through zero into reverse is desirable in most applications, the transmission, of which the outer races are driven with constant speed, will be preferable.

I claim:

1. A variable speed drive transmission comprising a driving shaft, a driven shaft coaxial with said driving shaft, a pair of inner races, a pair of outer races, one of said pairs of races being operatively coupled to said driving shaft, the other pair of said races being operatively coupled to said driven shaft, said races forming an annular groove, a plurality of balls in fixed circumferential spaced relationship radially displaceably supported in said groove for free rolling movement in contact with said pairs of races, the races of said outer pair being symmetrically shiftable with respect to the median plane of said balls, at least one race of said inner pair being axially displaceable, rollers arranged circumferentially between, and in contact with, said balls, and mounted for free rotation on axes parallel to said shafts, and a spider carrying said rollers, said outer races having a contact surface formed by a generatrix of greater radius than the generatrix of the contact surface of said inner races, and means including a reaction element drivingly connected with said outer races and said spider, for controlling their relative rotation.

2. A variable speed drive transmission as defined in claim 1, wherein the radii of said generatrices satisfy the relation $$r_o - r \geq 2 (r_1 - r)$$

wherein $r$ is the radius of the balls, $r_o$ the radius of the generatrix for the contacting surface of the outer races, and $r_1$ the radius of the curvature of the inner races.

3. A variable speed drive transmission as claimed in claim 2, wherein the outer races are straight internal cones, $r_o$ being infinite.

4. A variable speed drive transmission comprising a driving shaft, a driven shaft coaxial with said driving shaft, a pair of outer races operatively coupled and rotating with said driving shaft, a pair of inner races operatively connected with said driven shaft, one of said inner races being axially displaceable and the other race held stationary in axial direction, said inner and outer races forming an annular groove, a plurality of balls supported in said groove for free rolling displaceably in contact with said pairs of races, the races of said outer pair being symmetrically shiftable with respect to the median plane of said balls, rollers arranged circumferentially between and in contact with said balls, and mounted for free rotation on axes parallel to said shafts, and a spider carrying said rollers, the contacting faces of said races and balls satisfying the relation $$r_o - r \geq 2 (r_1 - r)$$

wherein $r$ is the radius of said balls, $r_o$ the radius of the curvature of the outer races, and $r_1$ the radius of the curvature of the inner races, and means including a reaction element drivingly connected with said outer races and said spider for controlling their relative rotation.

5. The variable speed drive transmission as defined in claim 4, wherein the outer races are straight internal cones, $r_o$ being infinite.

6. The variable speed drive transmission as defined in claim 4 including spring means forcing said inner races against said balls.

7. The variable speed drive transmission as defined in claim 4 including hydraulic means controlling the axial displacement of said outer races.

8. The variable speed drive transmission as defined in claim 7, wherein said hydraulic control means include a cylinder and piston rigidly attached to one of said outer races.

9. The variable speed drive transmission as defined in claim 7, comprising an oil cylinder rigidly attached to one of said outer races, said cylinder having a hub freely movably mounted on said driving shaft, a ring opening in said hub, and a bushing-like valve arranged adjacent said opening for controlling the oil supply to said cylinder.

10. In a variable speed drive transmission according to claim 6 comprising an intermediate shaft coaxially arranged between driving and driven shaft, and a torque responsive coupling means formed by an antifriction screw, with an inner member secured to the intermediate shaft and an outer member secured to the driven shaft.

11. In a variable speed drive transmission including a drive shaft and a driven shaft, change speed mechanism drivingly interconnecting said shafts comprising a pair of inner races operatively coupled to one of said shafts, a pair of outer races operatively coupled to the other of said shafts, said inner and outer races having respective surfaces defining an annular groove therebetween, said surfaces of said outer races being formed by a generatrix of greater radius than a generatrix forming said surfaces of said inner races, a plurality of transmission balls disposed in said groove for rolling movement in contact with said surfaces of said pair of races, reaction means operatively associated with said transmission balls, and means for shifting at least one of said races to change the positions of contact between the balls and said surfaces of said races to thereby change the drive ratio between said shafts.

12. A variable speed drive transmission as defined in claim 11 wherein the radii of said generatrices satisfy the relation $$r_o - r \geq 2 (r_1 - r)$$

wherein $r$ is the radius of the balls, $r_o$ is the radius of the generatrix of said surfaces of the outer races, and $r_1$ is the radius of the generatrix of said surfaces of the inner races.

13. In a variable speed drive transmission including a drive shaft and a driven shaft with change speed mechanism drivingly interconnecting said shafts including a pair of inner races and a pair of outer races with transmission balls in engagement with respect to the surfaces of the races in an annular groove therebetween, the improvement comprising radii of the generatrices of said surfaces of the races satisfying the relation $$r_o - r \geq 2 (r_1 - r)$$

wherein $r$ is the radius of the balls, $r_o$ is the radius of the generatrix of said surfaces of the outer races, and $r_1$ is the radius of the generatrix of said surfaces of the inner races.

14. In a variable speed drive transmission including a drive shaft and a driven shaft, change speed mechanism drivingly interconnecting said shafts comprising a pair of inner races operatively coupled to one of said shafts and rotatable with said one shaft, a pair of outer races operatively coupled with the other of said shafts and rotatable with said other shaft, said inner and outer races having respective raceways defining an annular groove therebetween, said raceways of said outer races being formed by a generatrix of greater radius than a generatrix forming said raceways of said inner races, a plurality of transmission balls disposed in said groove for rolling movement in contact with said raceways, means including a reaction element and a control element operatively associated with said transmission balls for controlling rotation of said races relative to said transmission balls, means for relatively shifting said races while maintaining the respective pairs of races symmetrical with respect to the median plane of said balls to change the positions of contact between the balls and said raceways to thereby change the drive ratio between said shafts, and means responsive to torque of said driven shaft for increasing the contact pressure between said balls and said races with increasing driven shaft torque.

15. A variable speed drive transmission as defined in claim 14 wherein the radii of said generatrices satisfy the relation $$r_o - r \geqq 2 \ (r_1 - r)$$

wherein $r$ is the radius of the balls, $r_o$ is the radius of the generatrix of said raceways of the outer races, and $r_1$ is the radius of the generatrix of said raceways of the inner races.

16. In a high speed variable ratio transmission: a power input shaft; a power output shaft; inner race means on one of said shafts comprising inner race rings and means for urging them toward each other; outer race means supported in a position around said inner race means, comprising outer race rings supported so as to be movable relatively toward each other; balls disposed between said inner and outer race means in rolling engagement with said race rings thereof; means for controlling the positions of said balls; and means for urging said outer race rings toward each other, comprising walls forming a fluid receiving chamber, one of said walls being movable by the pressure of said fluid, means connecting said movable wall to said outer race means so as to move the last named rings thereof toward each other, means for delivering fluid under pressure to said chamber from a source of fluid under pressure, and means for limiting the pressure of said fluid in said chamber.

17. In a high speed variable ratio transmission: a power input shaft; a power output shaft; inner race means on one of said shafts comprising inner race rings and means for urging them toward each other; outer race means supported in a position around said inner race means, comprising outer race rings supported so as to be movable relatively toward each other; balls disposed between said inner and outer race means in rolling engagement with said race rings thereof; means for controlling the positions of said balls; and means for urging said outer race rings toward each other, comprising walls forming a fluid receiving chamber, one of said walls being movable by the pressure of said fluid, means connecting said movable wall to said outer race means so as to move the last named rings thereof toward each other, means for delivering fluid under pressure to said chamber from a source of fluid under pressure, a control valve for controlling the flow of fluid into said chamber, and pressure regulating valve means for limiting the pressure of said fluid in said chamber.

18. In a high speed variable ratio transmission: a power input shaft; a power output shaft; inner race means on one of said shafts comprising inner race rings and means for urging them toward each other; outer race means supported in a position around said inner race means, comprising outer race rings supported so as to be movable relatively toward each other; balls disposed between said inner and outer race means in rolling engagement with said race rings thereof; means for controlling the positions of said balls; and means for urging said outer race rings toward each other, comprising an annular cylinder surrounding the other of said shafts, an annular piston in said cylinder, means connecting said piston to said outer race means so as to move said outer race rings toward each other in response to movement of said piston by fluid pressure in said cylinder, a delivery duct for the delivery of fluid under pressure into said cylinder, control valve means for controlling the flow of fluid through said duct to said cylinder, and auxiliary valve means connected to said cylinder so as to be responsive to fluid pressure therein, for limiting the magnitude of the fluid pressure which may be built up in said cylinder.

19. In a variable ratio transmission: a power input shaft; a power output shaft; a variable ratio transmission connecting said shafts, said transmission having means acting in response to pressure increments to change the ratio thereof from one extreme to the other; and means for applying pressure increments to said pressure responsive means of said transmission comprising an annular cylinder around one of said shafts, an annular piston in said cylinder, means for connecting said piston to said means of said transmission which acts in response to pressure increments, a duct for connecting said cylinder to a source of fluid under pressure, valve means for controlling the flow of fluid through said duct to said cylinder, and means for limiting the pressure of said fluid in said cylinder.

20. In a variable ratio transmission: a power input shaft; a power output shaft; a variable ratio transmission connecting said shafts, said transmission having means acting in response to pressure increments to change the ratio thereof from one extreme to the other; and means for applying pressure increments to said pressure responsive means of said transmission comprising walls forming a fluid receiving chamber, one of the walls of said chamber being movable in response to fluid pressure therein, means connecting said movable wall to said pressure responsive means of said variable ratio transmission, a duct connecting said chamber to a source of fluid under pressure, valve means for controlling the flow of fluid through said duct to said chamber, and means for limiting pressure of fluid in said chamber.

21. In a variable ratio transmission: an inner member having a pair of inner complementary race rings thereon; an outer member around said inner member having a pair of outer complementary race rings thereon facing said inner race rings; balls arranged between said inner and outer race rings and in rolling engagement therewith; a third member between said inner and outer race rings and having spaces for said balls; means supporting two of said members so that they may revolve around the axis of said inner and outer members; means supporting the remaining of said members so as to have reaction against rotation; means for urging the inner race rings toward each other; and an annular cylinder and piston arranged adjacent one of said outer race rings for urging said outer race rings toward each other.

22. A drive comprising an inner pair and an outer pair of axially separable concentric race rings, planetary means having rolling contact with each race ring, a torque loading device tending to close together one pair of said race rings, and an automatic control adjustably controlling the separation of the other pair of race rings as a function of the variations in driving speed.

23. A drive comprising an inner pair and an outer pair of axially separable race rings, planetary members having rolling contact with each race ring, a torque loading device tending to close together one pair of said race rings, the other pair of said race rings including a movable member having a motive pressure surface formed thereon, continuous biasing means preloading said race rings, means for confining pressurized fluid behind said motive surface, and means for communicating fluid pressure to said motive surface to load said movable member as a function of the speed of one of said race rings.

24. In a drive mechanism, four load-delivering race rings confining an annular row of planetary balls, two of said race rings comprising a pair of rings including an output ring and an axially movable adjustable speed control ring, preloading means continuously biasing said race rings, and means confining a supply of fluid pressure behind said speed control ring to adjust said speed control ring axially.

25. In a drive mechanism, four load-delivering race rings confining an annular row of planetary balls, two of said race rings comprising a pair of rings including an output ring and an axially movable adjustable speed control ring, continuous biasing means preloading said race rings, and variable loading means including a motive surface on said speed control ring, means confining fluid behind said motive surface, and means to supply fluid pressure to said motive surface as a function of the speed of one of said race rings.

26. In a drive mechanism, four load-delivering race rings confining an annular row of planetary balls, two of said race rings comprising a pair of rings including an output ring and an axially movable adjustable speed control ring, the other two of said rings comprising an input ring and an axially adjustable torque-reacting ring, each of said rings having a curved bearing surface closely approximating the curvature of the balls but being of sufficiently greater curvature to afford a material change of contact angle through radial movement of the balls, means for moving said speed control ring as a function of the speed of one of said race rings and means for adjusting said torque reacting ring as a function of load or torque reaction.

27. A speed ratio power transmission mechanism comprising a plurality of concentrically disposed race rings and an annular row of balls held in rolling contact with each of said race rings, said race rings including an input ring and an output ring, each facing the same way and one being fixed against relative axial displacement and further including ring means facing the opposite way, said ring means being axially movable and including a back face forming together with adjoining means a pressure control chamber, and an automatic control supplying pressurized fluid to said pressure control chamber for selectively moving said ring means toward said annular row of rings as a function of the speed increase.

28. In a variable speed drive transmission including a drive shaft and a driven shaft, change speed mechanism drivingly interconnecting said shafts comprising a pair of inner races coupled for rotating with one of said shafts and adapted for relative axial shifting, a pair of outer races coupled for rotating with the other of said shafts and adapted for relative axial shifting, said inner and outer races having respective raceway surfaces defining an annular groove therebetween, a plurality of transmission balls disposed in said groove for rolling movement in contact with said surfaces of said pairs of races, reaction means operatively associated with said transmission balls, said raceway surfaces of said inner and outer races being flatter than the surfaces of said transmission balls, means for shifting the races of one of said pairs toward one another to shift said transmission balls radially and to thereby change the speed ratio between said shafts, and means associated with the other of said pairs of races for urging said races toward one another with a force varying as the torque on said driven shaft.

References Cited by the Examiner

UNITED STATES PATENTS

| | | | |
|---|---|---|---|
| 1,526,493 | 2/1925 | Dolton | 74—796 |
| 1,686,446 | 10/1928 | Gilman | 74—796 |
| 1,691,625 | 11/1928 | Chilton | 74—796 |
| 2,076,057 | 4/1937 | Almen | 74—208 |
| 2,874,592 | 2/1959 | Oehrli | 74—796 |
| 2,901,924 | 9/1959 | Banker | 74—796 X |
| 2,905,026 | 9/1959 | Oehrli | 74—190.5 |
| 2,941,422 | 6/1960 | Barish | 74—796 |

FOREIGN PATENTS

| | | |
|---|---|---|
| 102,992 | 4/1926 | Austria. |
| 446,140 | 6/1927 | Germany. |
| 343,813 | 10/1936 | Italy. |
| 282,491 | 8/1952 | Switzerland. |

DON A. WAITE, *Primary Examiner.*

SAMUEL SPINTMAN, BROUGHTON G. DURHAM,
*Examiners.*